March 3, 1959 W. B. CALLAWAY 2,876,282
MULTILINE ANSWERING TIME RECORDER FOR USE IN TELEPHONE SYSTEMS
Filed Jan. 31, 1955 4 Sheets-Sheet 1
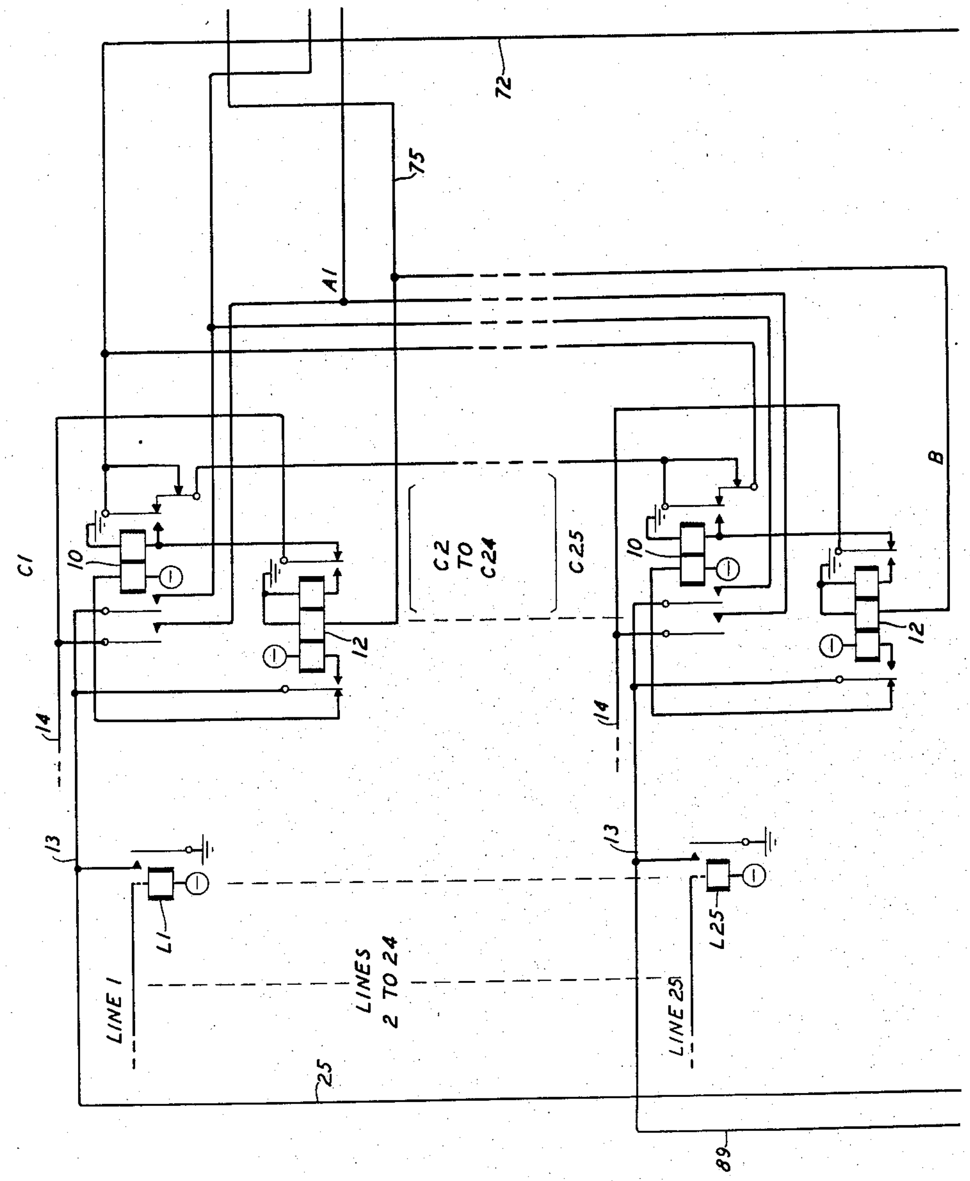
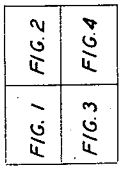
FIG. 5
FIG. 1
INVENTOR
W. B. CALLAWAY
BY A. F. Kane
ATTORNEY March 3, 1959
W. B. CALLAWAY
MULTILINE ANSWERING TIME RECORDER
FOR USE IN TELEPHONE SYSTEMS
2,876,282
Filed Jan. 31, 1955
4 Sheets-Sheet 2

INVENTOR
W. B. CALLAWAY
BY A. F. Kane
ATTORNEY

March 3, 1959 W. B. CALLAWAY 2,876,282

MULTILINE ANSWERING TIME RECORDER FOR USE IN TELEPHONE SYSTEMS

Filed Jan. 31, 1955 4 Sheets-Sheet 3

INVENTOR
W. B. CALLAWAY
BY A. F. Kane
ATTORNEY

March 3, 1959 W. B. CALLAWAY 2,876,282

MULTILINE ANSWERING TIME RECORDER FOR USE IN TELEPHONE SYSTEMS

Filed Jan. 31, 1955 4 Sheets-Sheet 4

INVENTOR
W. B. CALLAWAY
BY
A. F. Kane
ATTORNEY

United States Patent Office 2,876,282

Patented Mar. 3, 1959

2,876,282

MULTILINE ANSWERING TIME RECORDER FOR USE IN TELEPHONE SYSTEMS

William B. Callaway, Lodi, N. J., assignor to Bell Telephone Laboratories, Incorporated, New York, N. Y., a corporation of New York Application January 31, 1955, Serial No. 485,158

11 Claims. (Cl. 179—8.5)

Figure 2:
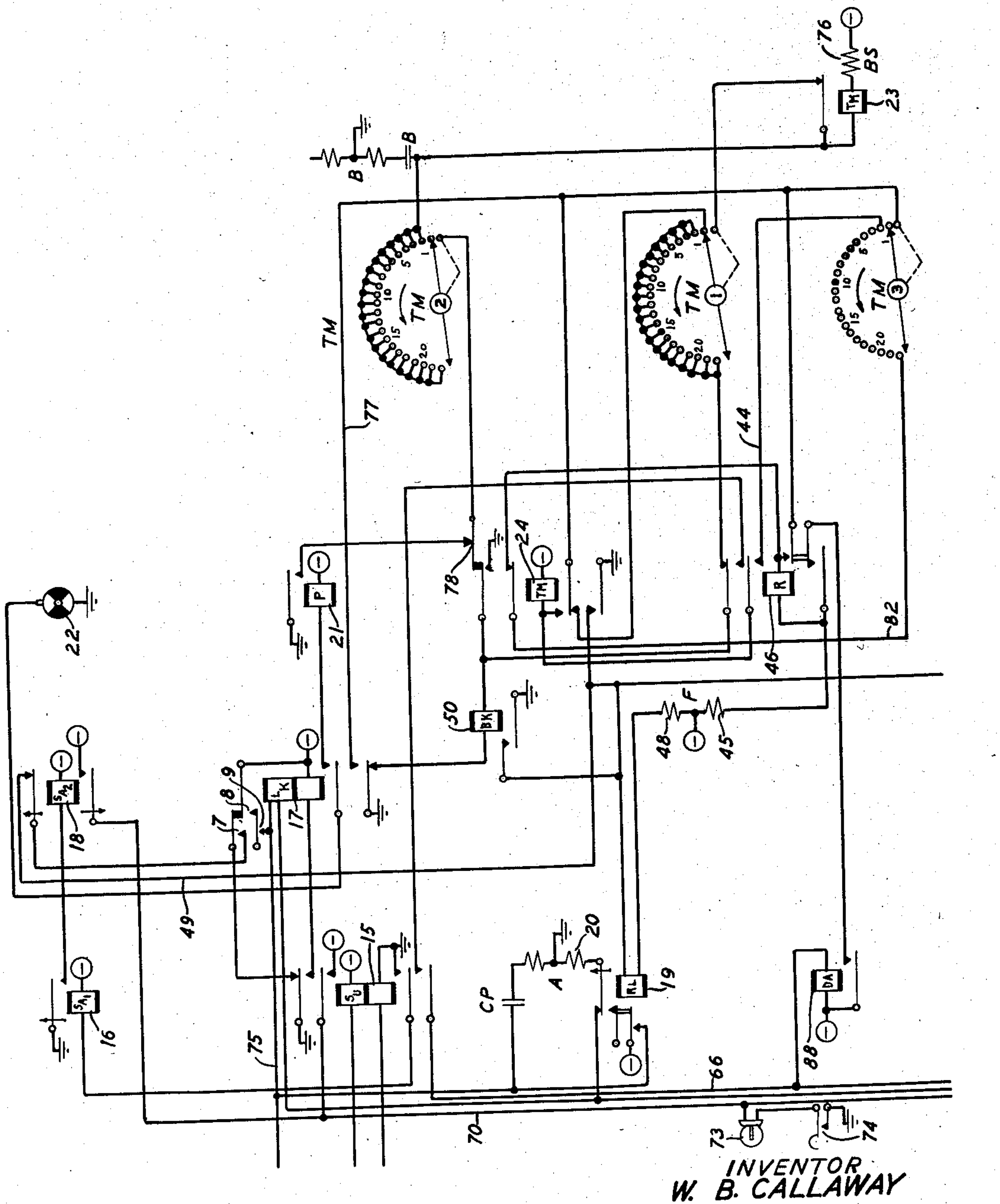

This invention relates to methods and means for checking the grade of service furnished telephone subscribers.

The worth of a telephone varies with the quality of service that is provided. Thus, if a telephone subscriber is to receive full value, it is necessary that the quality of telephone service be controlled, and, in order to be controlled, it must be measured.

Quality of telephone service, termed "grade" of service, is measured in various ways. One rather direct measure for operator-handled calls and services is "speed of answer." Speed of answer, which is concerned with how long a subscriber waits to get the services of an operator, is expressed in terms of the percent of answers with a delay exceeding a certain number of seconds. For example, at a toll switchboard, the speed of answer might be stated as "seven percent over ten seconds," meaning that, on seven percent of the calls the subscriber waited longer than ten seconds to get the services of an operator. For other types of switchboards the "bogey" interval may be twenty seconds or even five seconds. In any event, the speed of answer measurements are important in assuring that a satisfactory grade of telephone service is maintained.

Speed of answer measurements are obtained generally by means of an answering time recorder, either of the single line or multiline type.

The single line answering time recorder is a useful device, particularly where it is desirable to check the grade of service being received by a specific subscriber. However, being restricted to a single line, such a device does not lend itself to the generation of the large quantity of data required for officially indexing operator speed of answer unless a prohibitively large number of these devices is provided.

The multiline answering time recorder, as used today, is essentially a single line answering time recorder with an integral connector or "concentrator" which permits the recorder to attach to any one of a group of lines or trunks as a call originates on each. Such devices are known not to be entirely satisfactory from the viewpoint of accuracy. Since the multiline answering time recorder of present day design contains only one timing device and can, therefore, measure only one answering interval of time, it misses calls whenever two or more calls are waiting operators at one time and an error is introduced into the result. The data thus obtained lacks the accuracy required to permit an adequately correct evaluation of prevailing switchboard conditions and corresponding adjustments of operating personnel to be made.

It is an object of this invention to provide a method of and improved automatic means for obtaining telephone operator speed of answer data in sufficient volume for telephone central office administrative purposes. More particularly, it is an object of this invention to provide telephone answering time recording means which will measure, with a high degree of accuracy, the quantity $$\frac{D}{N}$$

where D is the number of telephone calls on which the operator answering time is delayed longer than a predetermined bogey interval of time and N is the total number of calls originated.

This object is attained in accordance with a feature of the invention by an organization of apparatus and circuitry which combine to "weight" each call that is measured, in the cumulated results, in accordance with the total number of calls originated in a group of lines or trunks being observed while each measurement is being made. That is, a call that is measured at a time when no other calls are seeking an operator is recorded as one call, whether or not it is answered within the bogey interval of time, and if another observed line bids for an operator while the original call is being measured, the measured call is counted as two calls, "slow answer" or not depending upon the measurement. Similarly, a measured call accompanied by two additional bids for operators counts as three calls of the type measured, etc.

In accordance with other features of the invention the improved answering time recording circuits function, (1) to count all calls or "starts" occurring on signal leads entering the associated connector or concentrator, regardless of whether or not the call represented by each of these starts is being measured by the answering time recorder; (2) to accumulate and store the value of this count during the interval of measurement of each call measured; and (3) at the end of each such interval of measurement, determined either by the removal of the start signal of the call being measured or by the expiration of the bogey interval of time, whichever occurs first, to "read out" the value of count stored into either or both of two registers on the following basis:

(*a*) If the interval of measurement is terminated by removal of the start signal of the call being measured, the read out is into one register only; and (*b*) if the interval of measurement is terminated by expiration of the bogey interval, the read out is into both registers.

These and other features of the invention will be readily understood from the following detailed description when read with reference to the accompanying drawings, Figs. 1, 2, 3 and 4 of which, when arranged as indicated in Fig. 5, constitute a circuit diagram of an answering time recorder embodying the features of the invention.

Figure 3:
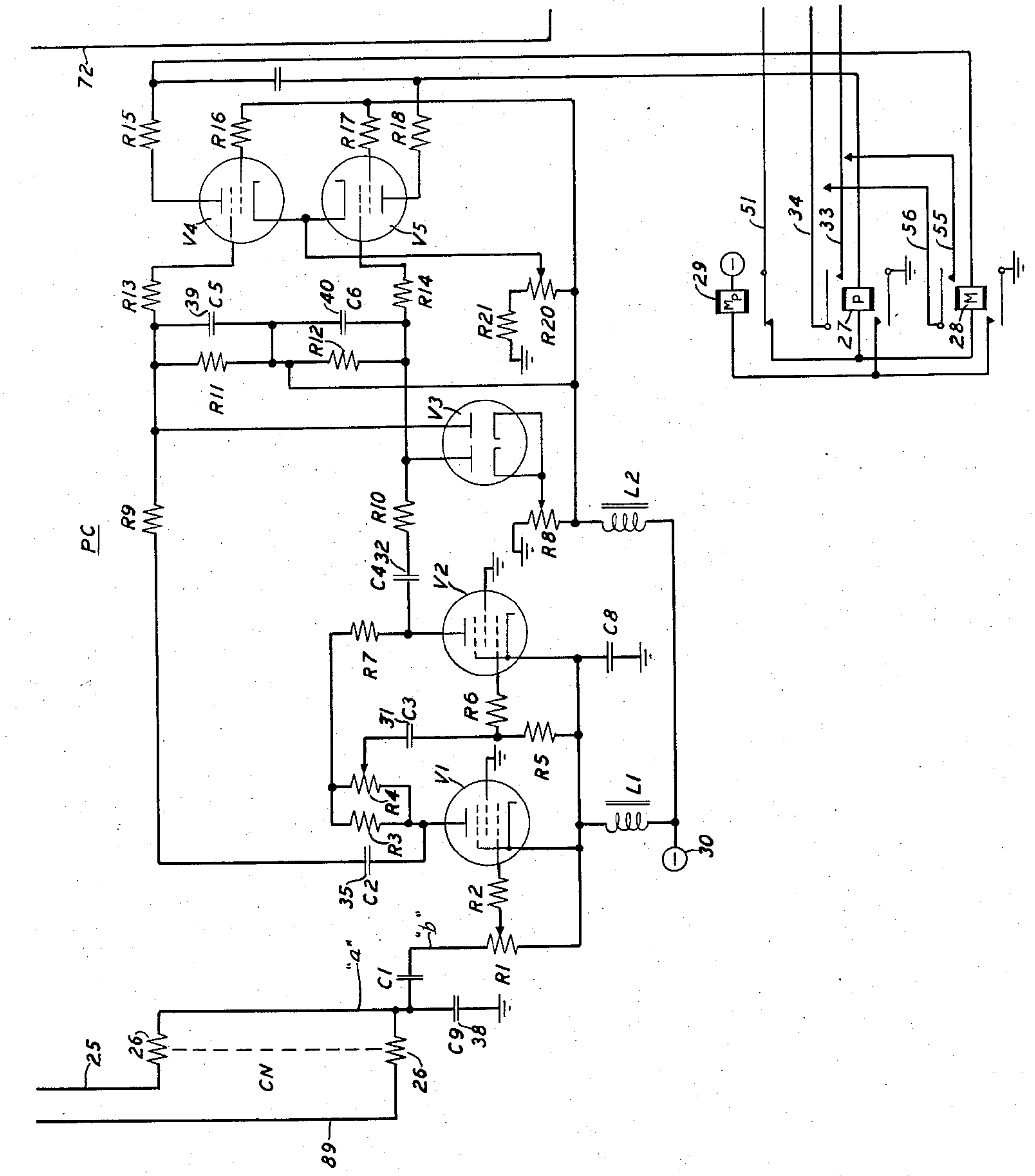
Figure 4:
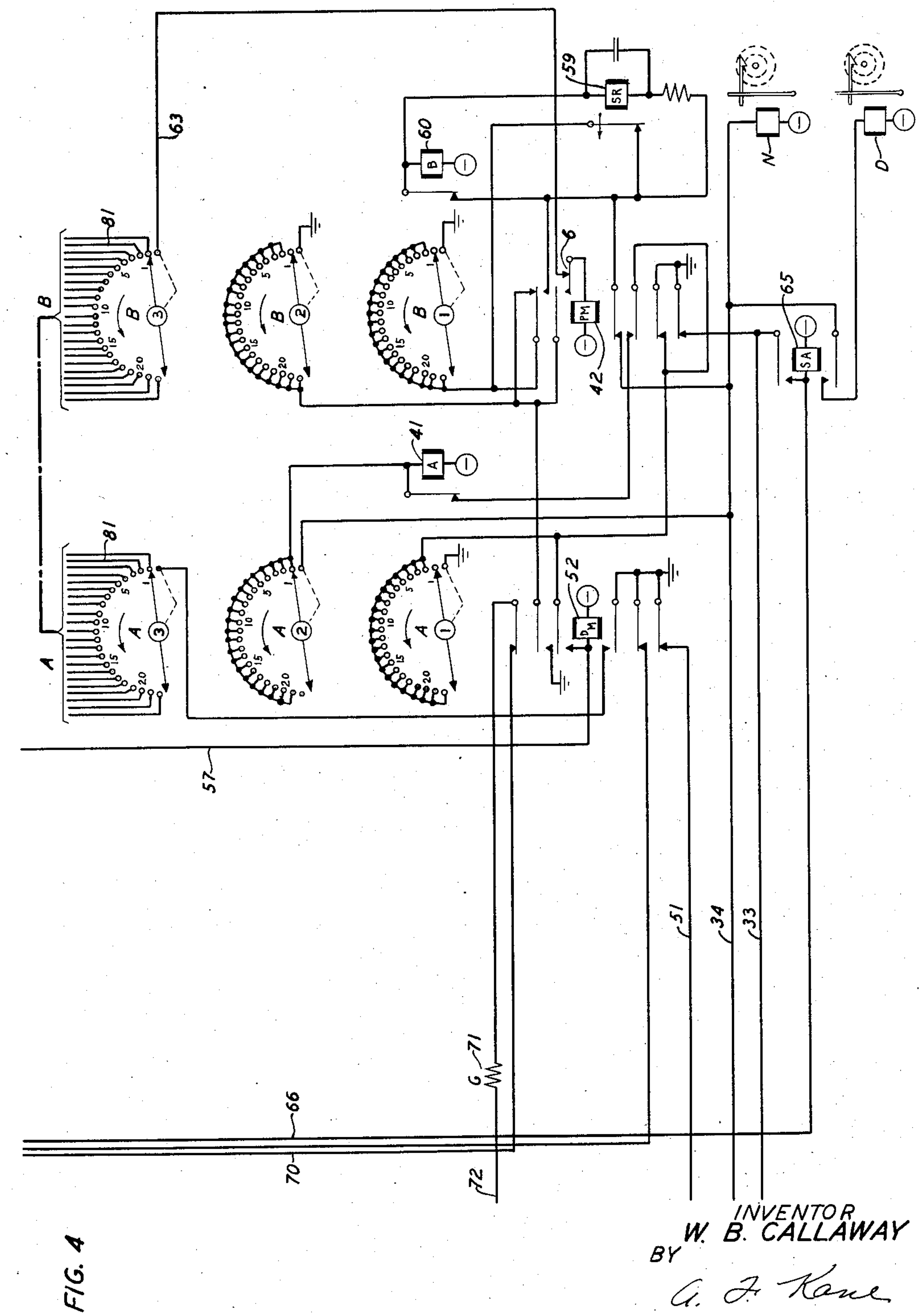

In the drawings:

Fig. 1 illustrates a pair of connector or concentrator circuits C1 and C25, each consisting of two relays. Each concentrator circuit is individual to one line or trunk and, by virtue of such circuits, a group of 25 lines or trunks has access to the circuit of Fig. 2 which is herein characterized as the answering time recorder timing and control circuit;

Fig. 2 comprises, essentially, a timing arrangement consisting of a rotary type selector TM which is driven by a pulse repeating relay 21, which, in turn, works from a 120 I. P. M. central office interrupter 22; a control circuit consisting of relays 15, 17, 19 and 50 for starting, stopping and resetting the timer when observed lines or trunks bid for an operator and are either answered or abandoned; and a time-out circuit consisting of relays 24 and 46 for stopping and resetting the timer when calls are delayed beyond the bogey interval for which the timer is set;

Fig. 3 shows an electronic peg count circuit comprising essentially a "concentrating" network CN consisting of 25 branches each including a 3900-ohm resistance, extending to the 25 signal leads 13 entering the connectors of Fig. 1; a "distinguishing" portion consisting of a pentode amplifier V1, a pentode phase inverter V2, a peak clipping limiter V3, and a pair of thyratrons V4 and V5; and a "driving" portion consisting of three relays 27, 28 and 29; and Fig. 4 shows the traffic "weighting" portion of the circuit which consists essentially of two rotary selector switches A and B, switch A being used to count the calls which originate on the observed group of 25 lines or trunks, and switch B being used to "read out" this count into the N register alone or into both registers D and N depending upon whether the interval measured by the timing means of Fig. 2 is less than or exceeds the bogey time interval.

The operation of the telephone answering time recorder circuits of this invention will now be described in detail and for this purpose reference is made to the circuit diagrams of Figs. 1, 2, 3 and 4 arranged as shown in Fig. 5.

In Fig. 1 there are shown two connector circuits C1 and C25, the former being individual to line or trunk No. 1 represented by relay L1 and the latter being individual to line or trunk No. 25 which is represented by relay L25. It is understood that the lines 1 and 25 constitute the first and last lines or trunks in a group of twenty-five served by the single answering time recorder timing circuit shown in Fig. 2. It will be observed that each connector circuit comprises two relays, such as relays 10 and 12, relay 10 being provided with a double winding. The relays, such as 10, are so illustrated to indicate that the connector circuits will function whether the trunk or line seizure is manifested by the connection of ground to lead 13 or battery to lead 14. For descriptive purposes and by way of example, it will be assumed that the line or trunk seizures which cause relays such as L1 and L25 to operate result in the application of ground potential to the leads 13.

The following description covers the seizure of line 1 when all other lines 2 to 25 are idle and also the situation where the call is either answered or abandoned before the expiration of the bogey time interval which, by way of example, is assumed to be 10 seconds.

Under the assumed time interval of 10 seconds, the No. 22 terminal of arc 3 of timing switch TM will be connected to conductor 82 and terminal No. 2 of the same arc 3 of switch TM will be connected to conductor 44. Other time intervals require different settings of conductors 44 and 82 with respect to the terminals of arc 3 of switch TM.

When the line 1 is seized at a subscriber's station (not shown), the seizure, for the purposes of this description, is manifested by the operation of relay L1 which is individual to line 1. Relay L1, operated, connects ground potential to both conductors 13 and 25, the former constituting a so-called "signal" lead extending to the connector C1 and the latter extending to the electronic peg count circuit PC, Fig. 3.

Ground potential on conductor 13 causes relay 10 to operate in a circuit extending from battery, through the left winding of relay 10, over the back contact and left armature of relay 12, conductor 13, to ground by way of the front contact and armature of relay L1. Relay 10, at its inner left armature and front contact, completes an operating circuit for relay 15 which circuit includes the upper winding of relay 15. At its right armature and front contact, relay 10 prepares a locking circuit for itself which is completed upon the operation of relay 15.

Relay 15, at its inner lower armature, establishes an obvious operating circuit for slow-to-release relay 16, which in turn, at its upper armature, completes an obvious operating circuit for slow-to-release relay 18. At its outer upper armature, relay 15 establishes an obvious operating circuit for relay 17 which includes the lower winding of relay 17. At its front contact and inner upper armature, relay 15 completes the locking circuit for relay 10 which circuit extends from battery, over the front contact and inner upper armature of relay 15, conductor 70, back contact and outermost upper armature of relay 52, resistance 71, conductor 72, right armature and front contact and right winding of relay 10 to ground. Relay 18, at its lower armature and front contact, also maintains a locking circuit for relay 10. The lamp 73 is lighted in parallel with the locking circuit just traced provided the key 74 is operated to its closed position.

Relays 16 and 18, which operate in tandem incident to the operation of relay 15, as described, constitute a slow release circuit to enable the timing circuit to ignore brief interruptions in start signals due to subscriber flashing or to other switching operations.

Relay 17 locks operated in a circuit which includes battery, the upper armature of relay 17 and the associated contacts 8 and 9, upper winding of relay 17, back contact and armature of relay 19, resistance 20 and ground. A parallel branch circuit extends also to direct ground at the middle lower armature and back contact of relay 52. At its upper armature and associated contacts 8 and 9, relay 17 also completes an energizing circuit for connector relay 12 by way of its middle winding and conductor 75. Similar relays 12 of all other connector circuits C2 to C25 are operated at this time. At its inner lower armature and front contact, relay 17 connects the winding of relay 21 to the central office 120 I. P. M. interrupter 22, and at its outer lower armature and front contact, completes an energizing circuit for stepping magnet 23 which extends from battery, over resistance 76, the winding, armature and back contact of stepping magnet 23, switch brush and terminal No. 1 of arc 1 of timing switch TM, back contact and inner lower armature of relay 24, conductor 77, front contact and outer lower armature of relay 17 to ground. The operation of magnet 23 in this circuit steps selector TM from position No. 1 to position No. 2.

The connection of relay 21 to interrupter 22, as described, causes this relay to operate and release under control of the interruptions and to cause the stepping magnet 23 to operate similarly. The operating circuit for magnet 23 may be traced from battery, over resistance 76, winding of magnet 23, terminals Nos. 2 to 22 and brush of arc 2 of switch TM, contact 78 of relay 24, front contact and armature of relay 21. The repeated operations of magnet 23 under control of interrupter 22 steps the switch TM around toward terminal No. 22 thereof. This operation of switch TM initiates the timing interval of ten seconds.

Should two or more calls appear simultaneously to simultaneously apply ground potential to more than one signal conductor 13, the operation of relays 12 will release all operated relays 10 with the exception of the relay 10 whose winding is nearest the battery supplied by relay 17. In this manner the timing circuit is able to concentrate on but one call at a time.

Before continuing with the description of the timing and control circuits of Fig. 2, the description will now revert back to the seizure of line 1 and the consequent application of ground potential to conductor 25 which extends to the peg count circuit PC.

The peg count circuit is required to count the number of calls or start signals which occur on the group of 25 signal leads 13 which enter the various connector circuits, C1, C2, etc., of the multiline answering time recorder circuit. Particularly, the peg count circuit concentrates the start signals from 25 separate signal leads into a common point; distinguishes a legitimate start signal from whatever else may get into the system; and drives the count storage apparatus of Fig. 4. In this circuit the "concentrating" network CN consists of 25 branches each containing a 3900 ohm resistance, such as resistance 26, extending to the twenty-five signal leads 13. The "distinguishing" portion of the peg count circuit consists of a pentode amplifier V1, a pentode phase inverter V2, a peak clipping limiter V3 and a pair of thyratrons V4 and V5. The "driving" portion of the circuit consists of relays 27, 28 and 29. With all of the signal leads 13 idle, point "*a*" of the peg count circuit is at minus 48-volt battery potential derived from the source 30. As each of the leads 13 is grounded, as was lead 13 of concentrator C1 as described above, indicating a start signal, the voltage at "*a*" takes an upward step (toward ground potential). As each lead is released, point "*a*" takes a step back (towards minus 48-volt battery potential). Thus, for every start signal a positive pip is produced at the point "*b*" and for every end signal a negative pip is produced.

The positive or start pips are amplified by the pentode V1 and appear as negative pips at the plate of tube V1. These negative pips are coupled by way of condenser 31 to the grid of the phase inverter V2 and appear as positive pips again at the plate of V2. They are then coupled by way of condenser 32 to the control grid of thyratron V5.

When thyratron V5 fires on such a pip, it operates the "plus" relay 27 whose operating winding is included in the plate circuit of tube V5 and finds ground at the outermost lower armature and back contact of relay 52. At its outer upper armature and front contact, relay 27 closes conductors 33 and 34 for driving the count storing switch A, Fig. 4. At its lower armature and front contact, relay 27 completes an obvious operating circuit for relay 29. Relay 29, operated, opens the plate circuit of tube V5 causing relay 27 to release and tube V5 to be extinguished. Negative or end pips appearing at the point "*b*" are amplified by V1 and appear as positive pips on its plate. These are coupled by way of condenser 35 to the control grid of thyratron V4. This tube, when it fires, operates the "minus" relay 28 which closes the minus leads 55 and 56, if used, for driving the count storing switch and completes an obvious operating circuit for relay 29. Relay 29, operated, releases relay 28, and restores the thyratron V4 to normal.

It is desirable that both positive firing and negative firing thyratrons be provided because, in the telephone plant, as previously indicated, both plus (negative battery changing to ground) and minus (ground changing to negative battery) start signals are used. It is necessary, therefore, to be able to count either positive or negative pips as start signals. Also, regardless of the polarity of the start signal pip, the end signal pip (of opposite polarity) is often accompanied by an overshoot transient of start polarity several volts higher than the legitimate start pips. In order to avoid counting these overshoots as start pips, it is desirable to provide a tube which will fire on end signals and momentarily disable the start tube.

The ability of this peg count circuit to distinguish between legitimate start signals and interference is due to the joint action of integrating condensers 38, 39 and 40 and the peak limiter V3. The peak limiter reduces the amount of integration required to prevent false counting when legitimate starts of moderate amplitude encounter interference from large but short-lived transients. When the peak amplitudes of these transients are limited to the value permitted by the limiter, they are correspondingly prevented from quickly charging the condensers 39 and 40 to the firing voltage of the gas tubes and causing a false count. Also, the limiter permits the response time of the "distinguisher" to be adjusted to ignore legitimate pulses of duration less than some set interval. This is required for certain types of switchboard operations wherein seizure of a trunk is often preceded by a trunk test action strong enough to seize the trunk for a period of time sufficiently long to produce a short preliminary start signal. With proper setting of the gain, sensitivity and limiter controls, these short signals may be ignored.

Having described in detail the peg count circuit PC and its operation, the description will now resume with the application of the start signal ground to conductor 25. As pointed out in the immediately preceding description of the peg count circuit, the application of a start signal to the conductor 25 results in the operation of relay 27 and the consequent closure of conductors 33 and 34. This momentary circuit closure completes a circuit which may be traced from battery, through the winding of magnet 41, the No. 1 terminal of arc 2 of selector switch A and the corresponding brush, conductor 34, upper armature and front contact of relay 27, conductor 33, back contact and outermost lower armature of relay 42, to ground. The magnet 41 operates and steps the selector A out of position No. 1 and into position No. 2. Thus, the seizure of line 1 results in switch A advancing one step and also in the initiation of a timing interval by the switch TM. Since it has been assumed that no calls or start signals originate on any other of the lines during the time measuring operation of switch TM, the count storage switch A will remain in position No. 2 as a result of the seizure of line 1 and will so remain until the call is answered or abandoned.

When the call on line 1 is answered or abandoned before the expiration of the bogey interval, the assumption in the immediate description, relay L1 will be released and ground potential removed from the leads 13 and 25. Removal of ground from conductor 13 releases relay 15 which, in turn, releases relay 16. Relays 16 and 18 are slow to release in order to hold open the operating circuit of relay 19 for a time interval of sufficient duration to absorb the flashes of miscellaneous trunks arranged for flashing lamps. Relay 16, released, releases relay 18 whereupon an operating circuit for relay 19 is completed. This circuit may be traced from battery, over resistance 48, through the winding of relay 19, conductor 49, back contact and upper armature of relay 18, front contact 7 and outer upper armature of relay 17, back contact and outer upper armature of relay 15 to ground. Relay 52 also operates at this time in a circuit which extends from battery, through the winding of relay 52, over conductor 57, the back contact and upper armature of relay 18, contact 7 of relay 17, back contact and outer armature of relay 15 to ground. Relay 52, operated, starts the "read out" operation.

Relay 52, at its middle upper armature and front contact extends ground over the back contact and outer upper armature of relay 42, armature and back contact of slow-to-release relay 59, the back contact, armature and winding of stepping magnet 60, to battery. Stepping magnet 60 operates in this circuit and advances the selector switch B until it reaches a position which coincides with the position of selector A. In the immediate description, selector A is resting in position No. 2 as described; selector B, therefore, is stepped one position to position No. 2. As the switch B advances, it generates one pulse for each step taken to effect the operation of register N accordingly. The operating circuit for register N includes the innermost lower armature and back contact of relay 42, the back contact and armature of slow-to-release relay 59, terminal No. 2 of arc 1 of switch B, and ground. The register N will thus register the call originated on line 1 and will display the numeral "1" if its previous reading was zero, otherwise its previous reading will be increased by one unit. It is understood that in the immediate description it has been assumed that no other calls originate on lines or trunks of the group of 25 during the measurement of the start signal produced by the seizure of line 1 and the consequent operation of relay L1. Relay 59, which operates in series with the self-stepping contact of selector B, slows the operation of selector B to a rate suitable for driving register N.

As soon as selector B reaches the position corresponding to the position previously reached by selector A, position No. 2 in the instant case, relay 42 operates in a circuit extending from battery through the winding of relay 42, armature contact 6 thereof, conductor 63, brush of arc 3 of switch B and the No. 2 terminal thereof, conductor 81, which interconnects terminals No. 2 of arcs 3 of switches B and A, and the associated brush, front contact and inner lower armature of relay 52 to ground. Relay 42, operated, opens the circuit to register N and causes selectors A and B to return at high speed to their original No. 1 positions. The control circuits for the steps magnets 41 and 60 of switches A and B, respectively, include the brushes and terminals Nos. 2 to 22 of arcs 1 of switches A and B, respectively. The count storage and read-out circuits are thus restored to normal and are ready to accept additional counts from the multiline answering time recorder circuit.

Reverting back to the measuring, or timing of the start signal which manifested itself by the operation of relay L1, it will be recalled that the bogey answering time interval is assumed to be ten seconds. The connection of relay 21 to interrupter 22, as previously described, causes this relay to follow the interruptions whereby stepping magnet 23 is repeatedly operated in a circuit which includes the armature and front contact of relay 21, the back contact 78 and outer upper armature of relay 24, successive switch terminals Nos. 2 to 22 of arc 2 of switch TM, the associated switch brush, the back contact, armature and winding of magnet 23 and resistance 76. Unless otherwise interrupted, the switch TM advances from terminal No. 2 to terminal No. 22. When the latter terminal is reached relay 46 operates in a circuit which extends from battery through the resistance 45, the windof relay 46, back contact and inner upper armature of relay 24, conductor 82, terminal No. 22 of arc 3 of switch TM and the associated brush, to ground by way of conductor 77, the front contact and outer lower armature of relay 17. Relay 46, operated, locks to ground directly at the outer lower armature and front contact of relay 17. At its inner upper armature and front contact, relay 46 prepares an operating circuit for relay 24. When terminal No. 1 on the second revolution on the selector brush assembly of switch TM is reached, the selector immediately steps to terminal No. 2 through its arc 1. The switch TM has thus measured the bogey interval which, in the instant case, is ten seconds.

When ground is removed from conductor 13, as described, relay 15 releases. Relay 15, released, causes relay 16 to release and open the operating circuit to relay 18. Relay 18, released, opens the locking circuit to relay 10 whereupon this relay releases. The release of relay 18 closes a circuit in which relay 19 operates. This circuit may be traced from battery, over resistance 48, winding of relay 19, conductor 49, back contact and upper armature of relay 18, front contact 7 and outer upper armature of relay 17, back contact and outer upper armature of relay 15 to ground.

The operation of relay 19 opens the locking circuit to relay 17 causing this relay to release. At its lower front contact and associated armature, relay 19 completes a holding circuit for relay 12 and all such relays of other connector circuits C2, C3, etc. The release of relay 17 opens the holding circuit for relay 46 and the operating circuit of relay 21. With relay 46 released, a circuit is closed to operate relay 50 in series with stepping magnet 23. This circuit extends from battery, through resistance 76 the winding of magnet 23, its armature and back contact, the brush and terminal No. 2 of arc 1 of switch TM, back contact and outer upper armature of relay 46, winding of relay 50, and back contact and outer lower armature of relay 17 to ground. The stepping magnet 23 thus functions to step the brush assembly of selector TM back to normal through self-interruptions. Relay 50 is slow to release in order to maintain the operating path of relay 19 while the selector is returning to normal. Since relay 19 holds connector relays such as relay 12 operated, calls appearing at this time will not be served by the timing circuit. When the selector reaches normal, relay 50 releases and, in turn, releases relay 19. The release of relay 19 opens the operating circuit of relays 12 and permits them to release.

As previously indicated, the multiline answering time recording circuit concludes its measurement of the call-indicating start signal on conductor 13 either when the call is answered or abandoned prior to the expiration of the bogey time interval, or when the delay on that call extends beyond the bogey interval. The preceding description has been addressed to the condition wherein the start signal is removed before the expiration of the bogey interval.

If the start signal has not been removed from conductor 13 by the time the brush assembly of switch TM has reached terminal No. 2 on the second cycle, relay 24 operates in a circuit extending from battery through the winding of relay 24, the inner upper armature and front contact of relay 46, conductor 44, terminal No. 2 of arc 3 of switch TM and the associated brush, front contact and outer lower armature of relay 17 to ground. Relay 24, operated, locks under direct control of relay 17; opens the operating circuit for relay 46; opens the stepping circuit of the TM selector; and operates relay 65 in a circuit extending from battery, through the winding of relay 65, conductor 66, outer lower armature and front contact of relay 15, front contact and outer upper armature of relay 46, outer upper armature and front contact of relay 24 to ground. Relay 52 operates also at this time in the manner previously described.

With relay 65 operated, the pulses generated by selector B in the manner previously described, serve not only to operate register D but also register N, it being apparent that register D is connected in parallel with register N by way of the lower armature and front contact of relay 65. Thus, all start signals, such as the signal on line 1, are registered on register N regardless of whether or not the bogey interval for answering calls, manifested by such start signals, is exceeded, and are registered on register D only in the event the bogey interval is exceeded.

The preceding descriptions are addressed exclusively to the condition which finds a call on but one line of a group of 20 lines and in which the measured interval thereof has been assumed to be: (1) less than the bogey interval and (2) greater than the bogey interval. The following description covers the condition in which, during the measuring interval of the call on line 1, several other calls or start signals appear on other lines of the group.

If, during the measuring of the start signal on line 1, bids for operators arise on other lines or trunks of the group served by this equipment, such bids are evidenced by the application of ground potential to a conductor similar to the conductor 25. For descriptive purposes, it will be assumed that, during the measuring of the start signal on line 1 by the timing switch TM, a call originates on line 25 and such call is manifested by the operation of relay L25. Relay L25, like relay L1 in the previous description, applies ground potential to the signal conductor 13 associated therewith. However, since relay 12 of connector circuit C25 is locked operated at this time, the corresponding relay 10 cannot operate. The ground on lead 13 associated with connector circuit C25, however, is connected to the 3900 ohm resistor 26 corresponding to line L25, by way of conductor 89. This causes the potential at point "*a*" of the peg count circuit PC to take a step upward in the direction of ground potential. The peg count circuit, therefore, again functions in the manner described in connection with the seizure of line L1 to cause relay 27 to operate and again close the leads 33 and 34 extending to the count storage circuit. The stepping switch A thereupon steps to terminal No. 3 in a manner now apparent to store the start signal occurring on line L25. When the read-out switch B functions as in the previous description, the register N will be operated to register two calls instead of one, and register D will be similarly operated to register two calls only if the call on line 1 being measured exceeds the bogey interval of ten seconds. Otherwise register D is not operated.

What is claimed is:

1. In a telephone system, a group of lines subject to seizure and answer conditions, a timing device, means responsive to a seizure condition on any of said lines for operating said timing device to initiate the measurement of a time interval, means for counting said line seizure and line seizures occurring during the operation of said timing device, a register, and means responsive to an answer condition on the line whose seizure initiated the operation of said timing device for operating said register in accordance with the number of line seizures counted by said counting means.

2. In a telephone system, a group of lines subject to seizure and answer conditions, a timing device, means responsive to a seizure condition of any of said lines for operating said timing means to initiate the measurement of a time interval of predetermined duration, means for counting said line seizure and all line seizures occurring during the operation of said timing device, a first register, a second register, and means responsive to an answer condition occurring on the line whose seizure initiated the operation of said timing device after the expiration of the said predetermined time interval for operating both said registers in accordance with the number of line seizures counted by said counting means.

3. In a telephone system, a group of lines subject to seizure and answer conditions, means responsive to the seizure of a line for measuring the time interval elapsing between seizure of said line and the application of an answer condition thereto, means for counting the number of line seizures in said group including the seizures occurring during the said elapsed time interval, a first register, a second register, means for operating said first register in accordance with the number of seizures counted if the said elapsed time interval exceeds a predetermined time duration, and means for operating said second register in accordance with the number of seizures counted if the said elapsed time interval is less than a predetermined time duration.

4. In a telephone system, a group of lines subject to seizure and answer conditions, means responsive to a seizure condition on one of said lines for measuring a time interval of predetermined duration commencing with the occurrence of said seizure condition, means for counting the number of line seizures in said group including seizures occurring during operation of said time measuring means, a first register, a second register, means controlled by said counting means for simultaneously operating both said registers in accordance with the number of line seizures counted at the expiration of the said time interval of predetermined duration, means responsive to the application of an answer condition to the said one of said lines prior to the expiration of the said time interval of predetermined duration for interrupting the operation of said time measuring means, and means responsive to such interruption of the operation of said time measuring means for operating a certain one of said registers in accordance with the number of line seizures counted.

5. In a telephone system, a group of lines subject to seizure and answer conditions, means for timing the operation of a seizure condition on one of said lines, means for counting seizures of lines in said group, and means responsive to an answer condition on the said one of said lines for registering the number of seizures counted by said counting means.

6. In a telephone system, a group of lines subject to seizure and answer conditions, means for registering line seizures as delayed answered seizures, means for registering line seizures as fast answered seizures, means for timing the duration of a seizure condiiton on one of said lines, means for counting line seizures, means responsive to the application of an answer condition to the said one of said lines prior to the expiration of a predetermined interval of time following the seizure thereof for operating said second registering means in accordance with the number of seizures counted by said counting means, and means acting at the expiration of a predetermined interval of time following the seizure of said one of said lines for operating said first and second registering means in accordance with the number of seizures counted by said counting means.

7. The combination, in a telephone system, of a group of lines subject to line seizure signals, a count storing device, electronic means for translating each line seizure signal in said group into a driving pulse to operate said count storing device to a condition corresponding to the number of line seizures, means responsive to a line seizure signal for measuring a time interval, a count read-out device, means controlled by said timing means for operating said count read-out device to a condition corresponding to the condition of said count storing device, and count registering means controlled by said count read-out device.

8. The combination in accordance with claim 7 and in which said electronic translating means includes means for distinguishing between legitimate and false line seizure signals.

9. The combination, in a telephone system, of a group of lines, a timing device, means responsive to the seizure of a line in said group of lines for causing operation of said timing device, a count storage switch, and means for operating said count storage switch in response to said line seizure comprising an electronic peg count circuit including means for translating said line seizure into a voltage pulse of moderate amplitude and of a particular polarity, means for amplifying the voltage pulse, a switch-driving circuit including relay means, means including a thyratron tube to impress the amplified voltage pulse on said driving circuit to effect the operation of said relay means, certain of said relay means operating to drive said count storage switch and certain other of said relay means operating to disable said first mentioned relay means and said thyratron, and means controlled jointly by said timing device and said count storage switch for registering the line seizure.

10. The combination according to claim 9 and in which said peg count circuit includes means comprising a voltage peak limiter for distinguishing between legitimate line seizures and conditions simulating line seizures.

11. The combination according to claim 9 and in which the lines of said group of lines are subject to interference potentials of large, but short-lived transients, and in which means are provided for distinguishing between the said voltage pulses of moderate amplitude and the large but short-lived transients comprising means for limiting the peak amplitude of the said transients and means for integrating peak-limited transients.

References Cited in the file of this patent

UNITED STATES PATENTS

| | | |
|---|---|---|
| 1,816,613 | Powell | July 28, 1931 |
| 2,421,942 | Hill | June 10, 1947 |
| 2,708,691 | Molnar | May 17, 1955 |